United States Patent
Reznik et al.

(10) Patent No.: US 8,181,093 B2
(45) Date of Patent: May 15, 2012

(54) METHOD AND APPARATUS FOR TRANSMITTING AND RECEIVING MULTIMEDIA BROADCAST MULTICAST SERVICES VIA A DEDICATED DOWNLINK CARRIER

(75) Inventors: Alexander Reznik, Titusville, NJ (US); Eldad M. Zeira, Huntington, NY (US); Chunxuan Ye, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1179 days.

(21) Appl. No.: 11/962,877

(22) Filed: Dec. 21, 2007

(65) Prior Publication Data

US 2008/0165806 A1 Jul. 10, 2008

Related U.S. Application Data

(60) Provisional application No. 60/882,786, filed on Dec. 29, 2006.

(51) Int. Cl.
*H03M 13/00* (2006.01)
(52) U.S. Cl. ...................................................... 714/776
(58) Field of Classification Search .................. 714/776, 714/781
See application file for complete search history.

(56) References Cited

U.S. PATENT DOCUMENTS

| | | | | |
|---|---|---|---|---|
| 4,962,498 | A * | 10/1990 | May, Jr. ........................ | 370/474 |
| 6,141,788 | A * | 10/2000 | Rosenberg et al. ........... | 714/774 |
| 6,172,972 | B1 * | 1/2001 | Birdwell et al. .............. | 370/349 |
| 7,057,534 | B2 | 6/2006 | Luby | |
| 7,265,688 | B2 | 9/2007 | Shokrollahi et al. | |
| 7,720,174 | B2 * | 5/2010 | Shokrollahi et al. .......... | 375/296 |
| 7,721,184 | B2 * | 5/2010 | Luby et al. .................... | 714/781 |
| 7,853,856 | B2 * | 12/2010 | Vedantham et al. .......... | 714/776 |
| 2003/0088695 | A1 | 5/2003 | Kwak et al. | |
| 2005/0085182 | A1 | 4/2005 | Chuberre et al. | |
| 2005/0147040 | A1 | 7/2005 | Vayanos et al. | |
| 2005/0242974 | A1 | 11/2005 | Shokrollahi et al. | |
| 2005/0246417 | A1 * | 11/2005 | Raith et al. .................... | 709/203 |

(Continued)

FOREIGN PATENT DOCUMENTS

WO 2005/067194 7/2005

OTHER PUBLICATIONS

Luby, Michael "LT Codes", *Proceedings of the ACM Symposium on Foundations of Computer Science*, 2002.

(Continued)

*Primary Examiner* — James C Kerveros
(74) *Attorney, Agent, or Firm* — Volpe and Koenig, P.C.

(57) ABSTRACT

A method and apparatus for wireless communication of multimedia broadcast multicast services (MBMS) data and unicast data using separate downlink carriers and are disclosed. A wireless transmit/receive unit (WTRU) having a single receiver that is switchable to receive either carrier is provided. A network station, such as a Node-B, preferably encodes K MBMS data packets to N MBMS encoded packets using erasure correction coding where N is preferably significantly greater than (K+v) which is a determined number of MBMS encoded packets sufficient to recover the K MBMS data packets. The Node-B preferably generates a superframe for carrying the N MBMS encoded packets for each MBMS and transmits the superframe via an MBMS carrier. The Node-B preferably schedules a unicast transmission such that the WTRU is provided with sufficient time to switch to the MBMS carrier to receive at least (K+v) MBMS encoded packets per superframe.

38 Claims, 1 Drawing Sheet

U.S. PATENT DOCUMENTS

| | | | | |
|---|---|---|---|---|
| 2008/0101317 | A1* | 5/2008 | Bouazizi | 370/342 |
| 2008/0232292 | A1* | 9/2008 | Zhang | 370/312 |
| 2008/0320358 | A1* | 12/2008 | Pandel et al. | 714/752 |
| 2010/0074355 | A1* | 3/2010 | Nguyen et al. | 375/267 |

OTHER PUBLICATIONS

Shokrollahi, Amin "Raptor Codes", Technical Report to Ecole Polytechnique Federale de Lausanne, 2005.

Ericsson "Mobility aspects of MBMS with SFN operations", TSG-RAN WG1 Meeting #47, Riga, Latvia, Nov. 6-10, 2006, R1-063497.

3rd Generation Partnership Project, Technical Specification Group Radio Access Network; "Multiplexing and channel coding (FDD)" (Release 7); 3GPP TS 25.212 V7.3.0 (Dec. 2006).

3rd Generation Partnership Project, Technical Specification Group Radio Access Network; "Multiplexing and channel coding (FDD)" (Release 7); 3GPP TS 25.212 V7.7.0 (Nov. 2007).

3rd Generation Partnership Project, Technical Specification Group Radio Access Network; "Multiplexing and channel coding (FDD)" (Release 8); 3GPP TS 25.212 V8.0.0 (Nov. 2007).

3rd Generation Partnership Project, Technical Specification Group Radio Access Network; "Spreading and modulation (FDD)" (Release 7); 3GPP TS 25.213 V7.0.0 (Mar. 2006).

3rd Generation Partnership Project, Technical Specification Group Radio Access Network; "Spreading and modulation (FDD)" (Release 7); 3GPP TS 25.213 V7.4.0 (Nov. 2007).

3rd Generation Partnership Project, Technical Specification Group Radio Access Network; "Physical layer aspects for evolved Universal Terrestrial Radio Access (UTRA)" (Release 7); 3GPP TR 25.814 V7.1.0 (Sep. 2006).

3rd Generation Partnership Project; Technical Specification Group Radio Access Network; "Continuous Connectivity for Packet Data Users" (Release 7) 3GPP TR 25.903 v1.2.0 (Nov. 2006).

3rd Generation Partnership Project; Technical Specification Group Radio Access Network; "Continuous Connectivity for Packet Data Users" (Release 7); 3GPP TR 25.903 V7.0.0 (Mar. 2007).

3rd Generation Partnership Project; Technical Specification Group Radio Access Network; "Improvement of the Multimedia Broadcast Multicast Service (MBMS) in UTRAN" (Release 7); 3GPP TR 25.905 v7.0.0 (Dec. 2005).

3rd Generation Partnership Project; Technical Specification Group Radio Access Network; "Improvement of the Multimedia Broadcast Multicast Service (MBMS) in UTRAN" (Release 7); 3GPP TR 25.905 v7.2.0 (Dec. 2007).

3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 8); 3GPP TS 36.300 v0.3.1 (Nov. 2006).

3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 8); 3GPP TS 36.300 V8.2.0 (Sep. 2007).

3rd Generation Partnership Project; Technical Specification Group Radio Access Network; "Continuous Connectivity for Packet Data Users" (Release 7); 3GPP TR 25.903 v1.2.0 (Nov. 2006).

* cited by examiner

METHOD AND APPARATUS FOR TRANSMITTING AND RECEIVING MULTIMEDIA BROADCAST MULTICAST SERVICES VIA A DEDICATED DOWNLINK CARRIER

CROSS REFERENCE TO RELATED APPLICATION

This application claims the benefit of U.S. provisional application No. 60/882,786 filed Dec. 29, 2006, which is incorporated by reference as if fully set forth.

FIELD OF INVENTION

The present invention is related to multimedia broadcast multicast services (MBMS) in a wireless communication system.

BACKGROUND

It has been proposed to allocate a dedicated downlink carrier for MBMS, (hereinafter referred to as "MBMS carrier"), in the third generation partnership project (3GPP) standardization group both in the context of the evolution of high speed packet access (HSPA) and long-term evolution (LTE) of the 3GPP. An unpaired downlink-only carrier is used for the MBMS carrier. A wireless transmit/receive unit (WTRU) should be able to receive data both on the conventional downlink carrier (hereinafter referred to as "unicast carrier") and on the MBMS carrier.

A WTRU with such a capability would typically have at least two receivers for two receive radio chains: one for MBMS carrier and the other for unicast carrier. The inventors have recognized that such a WTRU would cost more, use more power, and be bigger. Therefore, the inventors have devised methods and apparatus for receiving data on a unicast carrier and an MBMS carrier with a single receiver.

SUMMARY

A method and apparatus for wireless communication of multimedia broadcast multicast services (MBMS) data and unicast data using separate downlink carriers and are disclosed. A wireless transmit/receive unit (WTRU) having a single receiver that is switchable to receive either carrier is provided. Preferably, a network station, such as a 3GPP compliant Node-B, is configured to store K MBMS data packets for each MBMS. The Node-B preferably is configured to encode K MBMS data packets to N MBMS encoded packets where N is preferably significantly greater than the number of MBMS encoded packets sufficient to recover the K MBMS data packets. The Node-B is preferably configured to generate a superframe for carrying the N MBMS encoded packets for each MBMS and to transmit the superframe via an MBMS carrier. The MBMS data packets may be encoded using rateless coding, low density parity check (LDPC) coding, etc.

The Node-B is preferably configured to schedule a unicast transmission such that WTRUs are provided with sufficient time to switch to the MBMS carrier to receive at least (K+v) MBMS encoded packets per superframe where (K+v) is a number of MBMS encoded packets sufficient to recover the K MBMS data packets. The Node-B may also be configured to schedule a discontinuous reception (DRX) pattern for a WTRU for unicast carrier transmission so that the WTRU switches to the MBMS carrier during discontinuous reception period to receive at least (K+v) MBMS encoded packets per superframe.

BRIEF DESCRIPTION OF THE DRAWINGS

A more detailed understanding of the invention may be had from the following description of a preferred embodiment, given by way of example and to be understood in conjunction with the accompanying drawings.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B", (i.e., network station), includes but is not limited to a base station, a site controller, an access point (AP), or any other type of interfacing device capable of operating in a wireless environment.

Figure 1:
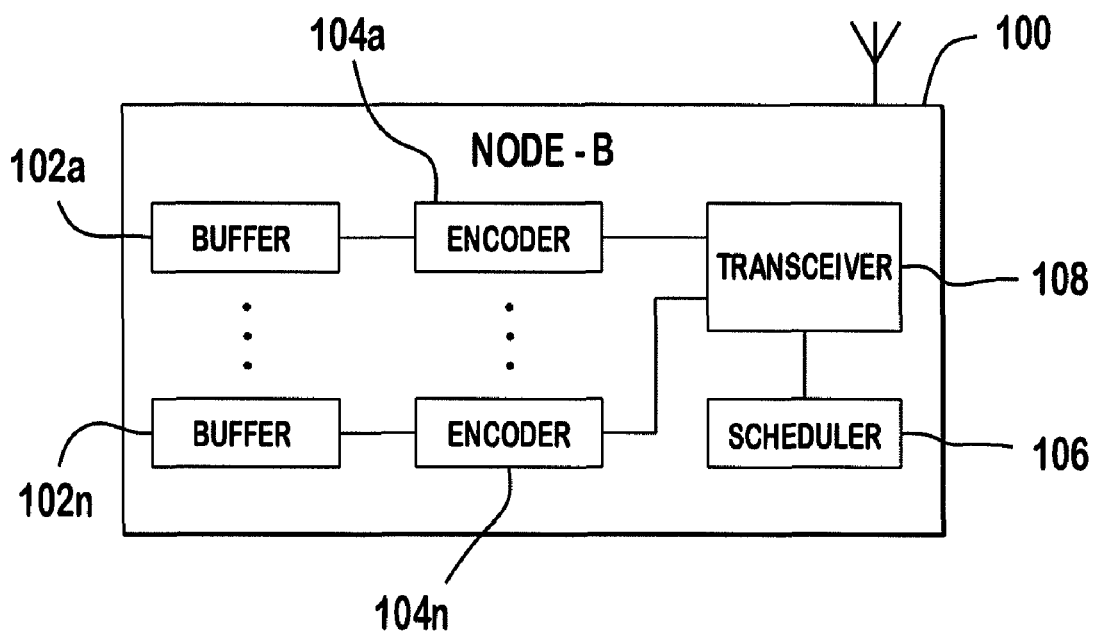
FIG. 1 is a block diagram illustrating a Node-B made in accordance with the teachings of the invention.

FIG. 1 shows an example Node-B 100. The Node-B 100 preferably includes a plurality of buffers 102a-102n, a plurality of encoders 104a-104n, a scheduler 106, and a transceiver 108. The Node-B 100 is preferably configured to provide MBMS services to a plurality of WTRUs via a dedicated MBMS carrier. The MBMS carrier preferably is able to carry a plurality of MBMS services simultaneously.

MBMS transmissions are preferably scheduled so that they minimally interfere with each other. For example, the MBMS services may be code, time, and/or frequency multiplexed.

The example Node-B 100 is configured to store MBMS data packets for each MBMS service in one of the buffers 102a-102n. The Node-B 100 is further configured such that stored MBMS data packets for each MBMS service are encoded by one of the encoders 104a-104n. The scheduler 106 is configured to schedule MBMS transmissions and/or unicast transmissions.

Scheduling coordination of MBMS transmissions and unicast transmissions is not desirable. Therefore, such coordination is preferably minimized. To accomplish this, the encoders 104a-104n are preferably configured to use a large-block-size error correction coding or an erasure correction coding capable of correcting large number of erasures and having a decoding algorithm of relatively low complexity.

When used, the erasure correction coding preferably transforms a message of K blocks into a message with more than K blocks, such that the original message may be recovered from a subset of the encoded blocks. The fraction of the blocks required to recover the original message is called a rate r. Optimal erasure correction coding produces N blocks where any $(1+\epsilon_{opt})$K blocks are sufficient to recover the original message. Optimal erasure correction coding is costly in terms of memory usage and processing time when K is large. When sub-optimal erasure correction coding is used, $(1+\epsilon)$K blocks are required to recover the original message, where $\epsilon$ represents a safety margin to ensure that the original K packets can indeed be decoded successfully. For example, the encoder 104a-104n may use a rateless coding constrained to a finite block size or LDPC coding. It should be noted that any other coding may be used.

An encoder 104a-104n encodes K MBMS data packets for a respective MBMS service to generate N coded packets where N is larger than K, preferably, significantly larger than K. The example Node B transceiver 108 is configured to generate one super-frame with the N coded packets and to transmit the super-frame via an MBMS carrier.

A basic time unit of an MBMS service is a "physical packet duration" (PPD), during which a single physical layer packet (PP) for an MBMS service is sent. A PPD may correspond to a conventional transmission time interval (TTI). The number of physical channel bits per PP, as well as the amount of resources (codes, sub-carriers, etc.) that is utilized is generally fixed for each MBMS service, but may vary on an MBMS service by service basis. The number of PPs in a superframe is typically fixed and preferably large. The amount of MBMS data to be transmitted per superframe is typically fixed for each MBMS service.

Figure 2:
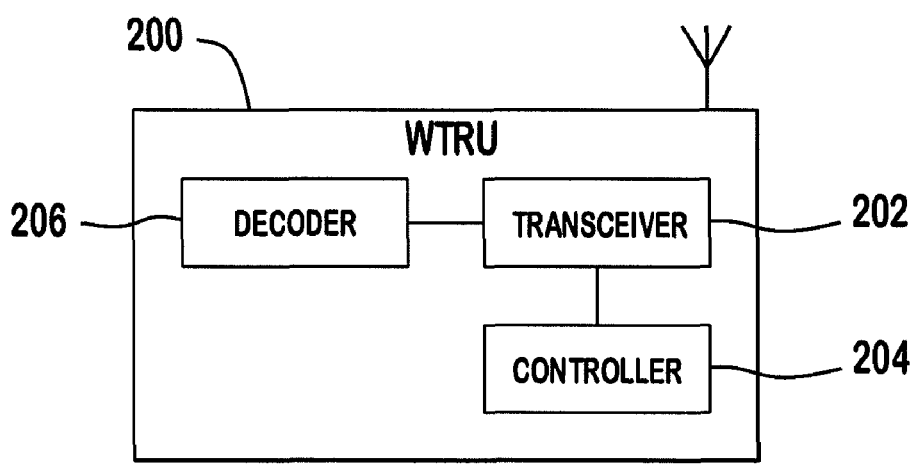
FIG. 2 a block diagram illustrating a WTRU made in accordance with the teachings of the invention.

FIG. 2 shows an example WTRU 200. The example WTRU 200 preferably includes a transceiver 202, a controller 204, and a decoder 206. The transceiver 202 is configured to receive downlink unicast transmissions via a unicast carrier and MBMS transmissions via an MBMS carrier. The controller 204 is configured to know a data rate associated with each MBMS service to which the WTRU is subscribed. The data rate preferably reflects the number of MBMS data packets K per super-frame for a given MBMS service.

In operation, the controller 204 controls the transceiver 202 to tune to either the MBMS carrier or the unicast carrier to selectively receive the MBMS data or the unicast data. The decoder 206 is configured to decode received MBMS encoded packets using an inverse of the coding scheme used at the Node-B 100 which transmitted the MBMS data. Example coding schemes include rateless coding, LDPC coding, etc.

Since the WTRU 200 preferably includes only one transceiver 202 for receiving both unicast services and MBMS services, the WTRU 200 is configured to switch from the unicast carrier frequency to the MBMS carrier frequency for at least K+ν PPDs in each super-frame. ν is a safety margin to make sure that K+ε PPs are received with high probability of success. The parameters ν and ε are both positive integers chosen by the system designer. The higher these are, the more reliably the scheme works, but the less efficient it is in terms of wasted bandwidth. As noted above ε represents a safety margin to ensure that the original K packets can indeed be decoded successfully. ν is preferably selected to be greater than ε to account for reception errors as discussed below.

The WTRU 200 may receive an indication that no data will be forthcoming to the WTRU 200 via the unicast carrier during some time interval. Preferably, the WTRU 200 is configured use such opportunity to switch to the MBMS carrier. Alternatively, the WTRU 200 can be configured to switch autonomously, potentially loosing data in the unicast transmission. In such case, the WTRU is preferably configured to selectively generate a hybrid automatic repeat request (H-ARQ) for retransmission of the unicast services.

The decoder 206 preferably processes at least K+ν coded MBMS packets per super-frame in order to successfully recover the MBMS data packets, where K is the number of MBMS data packets per super-frame in an MBMS service and ν is a positive integer selected to account for errors in packet reception. The additional ν coded MBMS packets are used because in addition to the K coded MBMS packets some other packets are typically received in error over the air interface.

Preferably, the Node-B 100 is configured to compute the value ν and determine how many MBMS reception opportunities the WTRU 200 needs, after the Node-B 100 is informed that the WTRU 200 is subscribed to MBMS services of a certain rate. Equivalently, the WTRU 200 can be required to receive a certain number of MBMS PPs per superframe.

The value ν determines how likely the WTRU 200 is to reliably receive the requisite K+ε PPs for successful decoding of the K information packets. Therefore, the value ν is preferably determined by the Node-B 100 based on the relative geographic location of the WTRU 200 in a cell and the configuration of the MBMS transmission. For example, if each PP is coded sufficiently well to withstand strong fading or if such fading is not likely in a given cell, the value ν may be set low. Otherwise, the value ν may need to be set higher. Alternatively, if the Node-B 100 is advised or determines that the WTRU 200 is near the Node-B 100, the value ν may be set relatively low, while if the Node-B 100 is advised or determines the WTRU 200 is relatively distant, such as near a cell edge, ν may be set much larger. The relative geographic location of the WTRU 200 is readily determined, albeit with a degree of uncertainty, with feedback associated with conventional unicast packet-data operation. Since MBMS transmission configuration is also known to the Node-B 100, the Node-B 100 has information sufficient to compute the value ν.

Alternatively, the Node-B 100 is configured to compute the value ν based on reports from the WTRU 200. For example, the value ν may be determined for all subscribers of an MBMS service based on MBMS reception success or failure rate reported from all or some WTRUs via a unicast cell. The report from the WTRU 200 may be accompanied by statistical or other description of the MBMS listening opportunities allowed for the WTRU 200. For example, the WTRU 200 may report at least one of the followings to the Node-B 100, i.e., to the network:

1) Listening opportunity ratio;
2) Listening opportunity window;
3) Signal strength, channel quality indicator (CQI) of anticipated reception quality in dedicated MBMS without interruptions;
4) Success rate;
5) Success coherence (measure of error burstiness); and
6) Frame number (or transmission sequence number (TSN)) of erroneous frames or protocol data units (PDUs).

Because there is some uncertainty in the geographic location of the WTRU 200 as observed by the Node-B 100 and because errors in MBMS packets transmissions may be caused by noise and fast fading, successful reception of MBMS coded packets cannot be guaranteed. If the WTRU 200 fails to receive at least K packets per super-frame successfully, the WTRU 200 may miss the whole super-frame. Therefore, the value ν represents a tradeoff between the probability of missing an MBMS super-frame and the amount of time the WTRU 200 has to spend receiving the MBMS carrier. This tradeoff is preferably considered by the Node-B 100 or another network entity in determining ν.

In scheduling unicast transmissions, the Node-B scheduler 106 preferably takes the value ν into account. For example, the scheduler 106 may front-load, i.e., priority schedule at the start of the super-frame, the MBMS reception opportunities for a WTRU 200 into the super-frame. Alternatively, the scheduler 106 may assume that there will be enough time at the end, which likely results in back-loading, i.e., scheduling towards the end of the super-frame, of the MBMS reception opportunities. Alternatively, the scheduler 106 may be configured to schedule MBMS reception opportunities in a uniform or in a random manner throughout the superframe.

The scheduler 106 may only be aware of a WTRU DRX pattern for the unicast transmissions. In such case, the Node-B 100 may preferably be configured to send the DRX pattern to the WTRU 200 so that the WTRU 200 receives the MBMS transmissions during the discontinuous reception period. Success or failure to receive the unicast transmissions may be reported by the WTRU 200 to the Node-B 100 so that the Node-B 100 may adjust the DRX pattern.

Problems may occur if the WTRU 200 requires a unicast data rate higher than that can be provided while satisfying the MBMS requirements. In this case, a medium access control (MAC) buffer for the unicast transmissions in the Node-B 100 may overflow. When this happens, DRX for the unicast transmissions is preferably suspended or modified by Node-B 100, or the unicast data rate may be reduced. Alternatively, a priority may be given to the unicast transmissions. In this case, the WTRU 200 may not be able to receive the MBMS transmissions on the dedicated cell. Failure to receive MBMS transmissions may be signaled by the WTRU 200 to the Node-B 100 and the network may provide the missed MBMS transmissions via the unicast carrier.

The WTRU may be subscribed to an MBMS service while receiving data over the unicast service. The unicast service may then be given a priority over the MBMS service. For example, the unicast service may be supporting a voice over Internet protocol (VoIP) call, while the MBMS service is distributing low-rate location-specific information such as advertising. In this case, the WTRU 200 may inform the Node-B 100 of the number of PPDs the WTRU 200 is required to dedicate for the MBMS carrier. The Node-B 100 then preferably utilizes appropriate scheduling, e.g., continuous packet connectivity (CPC) with DRX cycles, so that there is a large number of TTIs available for the WTRU 200 to switch to the MBMS carrier. The WTRU 200 preferably utilizes every available opportunity to switch to the MBMS carrier.

The WTRU 200 may be configured to monitor a paging indicator channel (PICH), a paging channel (PCH), and a broadcast channel (BCH) while connected to an MBMS service. The WTRU 200 may then be configured to switch to the unicast carrier to listen to the PICH, PCH, and BCH, after learning of the time instances for the PICH, PCH and/or BCH. Where the MBMS service is erasure correction coded, e.g., rateless coded, the WTRU 200 may be configured to satisfy its requirement for the PICH, PCH, and BCH reception on the unicast carrier, while devoting the rest of the time to the MBMS carrier. Based on its own PICH, PCH, and BCH schedule and other measurement requirements, the WTRU 200 can be configured to autonomously switch between the unicast carrier and MBMS carrier.

Although the features and elements are described in particular combinations, each feature or element may be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for wireless communication of multimedia broadcast multicast service (MBMS) data comprising:
    encoding K MBMS data packets to a larger number N of MBMS encoded packets, where N is selected to be greater than a number of encoded packets determined to be sufficient to recover the K MBMS data packets;
    generating a superframe for carrying the N MBMS encoded packets for the MBMS;
    receiving a notice from a wireless transmit/receive unit (WTRU) having a switchable carrier receiver that the WTRU is subscribed for the MBMS;
    transmitting, on a unicast carrier, a unicast carrier transmission that enables the WTRU to have sufficient time to switch from reception of the unicast carrier to reception of the MBMS carrier and enables the WTRU to receive at least (K+v) MBMS encoded packets per superframe on the MBMS carrier, where v is a positive integer based upon selected packet error criteria such that v provides a safety margin that enables the WTRU to successfully recover the K MBMS data packets;
    transmitting the superframe to the WTRU via a MBMS carrier.

2. The method of claim 1 wherein the MBMS data packets are encoded using rateless coding.

3. The method of claim 1 wherein the MBMS data packets are encoded using low density parity check (LDPC) coding.

4. The method of claim 1 further comprising:
    scheduling a discontinuous reception (DRX) pattern for the WTRU having a switchable carrier receiver for unicast carrier transmission; and
    transmitting on the unicast carrier the DRX pattern to the WTRU to enable the WTRU switch to the MBMS carrier during DRX period to receive at least (K+v) MBMS encoded packets per superframe.

5. The method of claim 4 further comprising transmitting a message to suspend discontinuous reception of the unicast carrier by the WTRU if the WTRU requires a data rate for unicast carrier transmission higher than that which can be delivered while satisfying requirements to receive at least (K+v) MBMS encoded packets per superframe on the MBMS carrier.

6. The method of claim 5 further comprising:
    receiving a notice from the WTRU that the WTRU failed to receive encoded MBMS data packets; and
    sending the MBMS data packets via the unicast carrier.

7. The method of claim 1 further comprising increasing a data rate for transmissions on a unicast carrier if the WTRU having a switchable carrier receiver requires a data rate for unicast carrier transmissions higher than that which can be delivered while satisfying requirements to receive at least (K+v) MBMS encoded packets per superframe on the MBMS carrier.

8. The method of claim 1 further comprising providing a priority to transmission via a unicast carrier if the WTRU having a switchable carrier receiver requires a data rate for unicast carrier transmission higher than a data rate that can be delivered while satisfying requirements to receive at least (K+v) MBMS encoded packets per superframe on the MBMS carrier.

9. The method of claim 8 further comprising:
receiving a notice from the WTRU that the WTRU has failed to receive encoded MBMS data packets; and
sending the MBMS data packets via the unicast carrier.

10. The method of claim 1 wherein the value v is determined based on the relative geographic location of the WTRU.

11. The method of claim 1 wherein the value v is determined based on a MBMS reception success and failure rate at the WTRU.

12. A method for receiving multimedia broadcast multicast services (MBMS) data and unicast data comprising:
switching a single receiver in a wireless transmit/receive unit (WTRU) from reception on a unicast carrier to reception on an MBMS carrier;
receiving at least (K+v) MBMS encoded packets per superframe via the MBMS carrier, where K is the number of packets to be recovered in a superframe and value v is a positive integer determined based upon packet reception error criteria; and
decoding the received at least (K+v) MBMS encoded packets per superframe to recover the K MBMS data packets.

13. The method of claim 12 further comprising switching from reception on the unicast carrier to reception on the MBMS carrier when no data is being received by the WTRU via the unicast carrier.

14. The method of claim 12 further comprising switching from reception on the unicast carrier to reception on the MBMS carrier autonomously such that data transmitted via the unicast carrier may be lost.

15. The method of claim 12 wherein the decoding is performed with respect to encoded MBMS data packets that are encoded using rateless coding.

16. The method of claim 12 wherein the decoding is performed with respect to encoded MBMS data packets that are encoded using low density parity check (LDPC) coding.

17. The method of claim 12 further comprising receiving on the unicast carrier a discontinuous reception (DRX) pattern for unicast carrier transmission and switching to the MBMS carrier during discontinuous reception periods to receive the at least (K+v) MBMS encoded packets per superframe.

18. The method of claim 12 further comprising:
notifying a Node-B that the WTRU has failed to receive encoded MBMS data packets on the MBMS carrier; and
receiving the MBMS data packets via the unicast carrier.

19. The method of claim 12 further comprising:
receiving on the unicast carrier at least one of a paging indicator channel (PICH), a paging channel (PCH) and a broadcast channel (BCH); and
thereafter switching to receive on the MBMS carrier.

20. A network station configured for wireless communication of multimedia broadcast multicast service (MBMS) data and unicast data comprising:
an encoder configured to encode K buffered MBMS data packets to a larger number N of MBMS encoded packets, where N is selected to be greater than a number of encoded packets determined to be sufficient to recover the K MBMS data packets;
a transceiver configured to generate a superframe for carrying the N MBMS encoded packets and to transmit the superframe via a MBMS carrier;
a component configured to determine a positive integer v based upon selected packet error criteria such that (K+v) reflects the number of encoded packets determined to be sufficient for a wireless transmit/receive unit (WTRU) to recover the K MBMS data packets and configured to select N to be greater than (K+v); and
a scheduler configured to schedule a unicast carrier transmission to the WTRU having a switchable carrier receiver to provide sufficient time for the WTRU to switch to MBMS carrier reception to receive at least (K+v) MBMS encoded packets per superframe.

21. The network station of claim 20 configured as a 3GPP compliant Node-B wherein the encoder configured to encode the MBMS data packets using rateless coding.

22. The network station of claim 20 configured as a 3GPP compliant Node-B wherein the encoder configured to encode the MBMS data packets using low density parity check (LDPC) coding.

23. The network station of claim 20 further comprising:
a scheduler configured to generate a discontinuous reception (DRX) pattern for unicast carrier transmission to a wireless transmit/receive unit (WTRU) having a switchable carrier receiver to enable the WTRU to switch to MBMS carrier reception during discontinuous reception period to receive at least (K+v) MBMS encoded packets per superframe.

24. The network station of claim 23 wherein the transceiver is configured to transmit a message to suspend discontinuous reception of the unicast carrier by the WTRU if the WTRU requires a data rate for unicast carrier transmission higher than that which can be delivered while satisfying requirements to receive at least (K+v) MBMS encoded packets per superframe on the MBMS carrier.

25. The network station of claim 24 wherein the transceiver is configured to transmit the MBMS data packets via the unicast carrier if a notice is received from the WTRU that the WTRU has failed to receive encoded MBMS data packets.

26. The network station of claim 20 wherein the transceiver is configured to transmit at an increased data rate via the unicast carrier if a wireless transmit/receive unit (WTRU) having a switchable carrier receiver requires a data rate for unicast carrier transmission higher than that which can be delivered while satisfying requirements to receive at least (K+v) MBMS encoded packets per superframe on the MBMS carrier.

27. The network station of claim 26 wherein the transceiver is configured to provide priority to transmission via the unicast carrier if the WTRU requires a data rate for unicast carrier transmission higher than that which can be delivered while satisfying requirements to receive at least (K+v) MBMS encoded packets per superframe on the MBMS carrier.

28. The network station of claim 27 wherein the transceiver is configured to transmit the MBMS data packets via the unicast carrier if a notice is received from the WTRU that the WTRU has failed to receive the MBMS data packets.

29. A wireless transmit/receive unit (WTRU) for receiving multimedia broadcast multicast services (MBMS) data and unicast data comprising:

a carrier switchable transceiver configured to switch between reception on a MBMS carrier and reception on a unicast carrier;

a controller configured to switch the transceiver to MBMS carrier reception to receive at least (K+v) MBMS encoded packets per superframe via the MBMS carrier, where K is the number of packets to be recovered in a superframe and value v is a positive integer selected to account for errors in packet reception; and a decoder configured to decode the received at least (K+v) MBMS encoded packets per superframe to recover the K MBMS data packets.

30. The WTRU of claim 29 wherein the controller is configured to switch the transceiver to MBMS carrier reception when no data is forthcoming to the WTRU via the unicast carrier.

31. The WTRU of claim 29 wherein the controller is configured to switch the transceiver to MBMS carrier reception autonomously such that data transmitted via the unicast carrier may be lost.

32. The WTRU of claim 29 wherein the controller is configured to use a value v determined based on the relative geographic location of the WTRU.

33. The WTRU of claim 29 wherein the controller is configured to use a value v determined based on a MBMS reception success and failure rate at the WTRU.

34. The WTRU of claim 29 wherein the decoder is configured to decode encoded MBMS data packets that are encoded using rateless coding.

35. The WTRU of claim 29 wherein the decoder is configured to decode encoded MBMS data packets that are encoded using low density parity check (LDPC) coding.

36. The WTRU of claim 29 wherein the controller is configured to control the transceiver to receive on the unicast carrier a discontinuous reception (DRX) pattern for unicast carrier transmission and to switch to the MBMS carrier during discontinuous reception periods to receive the at least (K+v) MBMS encoded packets per superframe.

37. The WTRU of claim 29 wherein the controller is configured to control the transceiver to notify a Node-B that the WTRU has failed to receive encoded MBMS data packets on the MBMS carrier and to then receive the MBMS data packets via the unicast carrier.

38. The WTRU of claim 29 wherein the controller is configured to control the transceiver to receive on the unicast carrier at least one of a paging indicator channel (PICH), a paging channel (PCH) and a broadcast channel (BCH) and to thereafter switch to receive on the MBMS carrier.

* * * * *